(12) United States Patent
Minardi et al.

(10) Patent No.: US 10,394,202 B2
(45) Date of Patent: Aug. 27, 2019

(54) 3D PRINTER CALIBRATION AND CONTROL

(71) Applicant: Voxel8, Inc., Somerville, MA (US)

(72) Inventors: John Minardi, Somerville, MA (US);
Travis Busbee, Somerville, MA (US);
Jonathan Tran, Somerville, MA (US);
Max Eskin, Somerville, MA (US)

(73) Assignee: Voxel8, Inc., Somerville, MA (US)

( * ) Notice: Subject to any disclaimer, the term of this patent is extended or adjusted under 35 U.S.C. 154(b) by 84 days.

(21) Appl. No.: 15/211,668

(22) Filed: Jul. 15, 2016

(65) Prior Publication Data

US 2017/0050374 A1 Feb. 23, 2017

Related U.S. Application Data

(60) Provisional application No. 62/208,222, filed on Aug. 21, 2015, provisional application No. 62/340,389, (Continued)

(51) Int. Cl.
| | |
|---|---|
| *G05B 15/02* | (2006.01) |
| *B33Y 50/02* | (2015.01) |
| *B33Y 10/00* | (2015.01) |
| *B33Y 30/00* | (2015.01) |
| *B29B 7/72* | (2006.01) |
| *G05B 19/4099* | (2006.01) |
| *B29B 7/74* | (2006.01) |
| *B29C 64/106* | (2017.01) |
| *B29C 64/124* | (2017.01) |
| *B29C 64/386* | (2017.01) |
| *B29C 64/35* | (2017.01) |

(Continued)

(52) U.S. Cl.
CPC ............. *G05B 15/02* (2013.01); *B29B 7/72* (2013.01); *B29B 7/74* (2013.01); *B29C 64/106* (2017.08); *B29C 64/124* (2017.08); *B29C 64/35* (2017.08); *B29C 64/386* (2017.08); *B33Y 10/00* (2014.12); *B33Y 30/00* (2014.12); *B33Y 50/02* (2014.12); *G05B 19/4099* (2013.01); *B29K 2105/0005* (2013.01); *B33Y 50/00* (2014.12); *G05B 2219/35134* (2013.01); *G05B 2219/49007* (2013.01)

(58) Field of Classification Search
CPC ...................... G05B 19/4099; B29C 64/386
See application file for complete search history.

(56) References Cited

U.S. PATENT DOCUMENTS

| | | | |
|---|---|---|---|
| 7,141,617 | B2 | 11/2006 | Gratson et al. |
| 7,799,251 | B2 | 9/2010 | Therriault et al. |

(Continued)

FOREIGN PATENT DOCUMENTS

| | | |
|---|---|---|
| WO | 2014182535 A1 | 11/2014 |
| WO | 2015073944 A2 | 5/2015 |

*Primary Examiner* — Robert A Vetere
(74) *Attorney, Agent, or Firm* — Wolf, Greenfield & Sacks, P.C.

(57) ABSTRACT

Calibration and control of a 3D printing device is disclosed. In one aspect, sensor-based feedback may be used to iteratively determine and align line height calibration settings of the 3D printing device. In another aspect, the 3D printing device may include an instruction pre-processor to detect placeholder data in received machine instructions and to replace the placeholder data with instructions that are executable by the 3D printing device.

7 Claims, 7 Drawing Sheets

Related U.S. Application Data filed on May 23, 2016, provisional application No. 62/340,421, filed on May 23, 2016, provisional application No. 62/340,453, filed on May 23, 2016, provisional application No. 62/340,436, filed on May 23, 2016, provisional application No. 62/340,432, filed on May 23, 2016.

(51) Int. Cl.
*B29K 105/00* (2006.01)
*B33Y 50/00* (2015.01)

(56) References Cited

U.S. PATENT DOCUMENTS

| | | | |
|---|---|---|---|
| 7,922,939 | B2 | 4/2011 | Lewis et al. |
| 7,956,102 | B2 | 6/2011 | Lewis et al. |
| 8,187,500 | B2 | 5/2012 | Lewis et al. |
| 2014/0314954 | A1 | 10/2014 | Lewis et al. |
| 2015/0352839 | A1* | 12/2015 | Folkins .................. B33Y 50/02 347/14 |
| 2016/0375640 | A1* | 12/2016 | Cho ...................... B29C 64/386 425/141 |
| 2018/0154573 | A1* | 6/2018 | Miles .................. H05K 3/4664 |

* cited by examiner

3D PRINTER CALIBRATION AND CONTROL

CROSS-REFERENCE TO RELATED APPLICATIONS

This application claims the benefit of U.S. Provisional Patent Application No. 62/208,222, filed Aug. 21, 2015 and entitled "Closed-Loop 3D Printing Incorporating Sensor Feedback," U.S. Provisional Patent Application No. 62/340,389, filed May 23, 2016 and entitled "SYSTEM AND METHOD TO CONTROL A THREE-DIMENSIONAL (3D) PRINTER," U.S. Provisional Patent Application No. 62/340,421, filed May 23, 2016 and entitled "SYSTEM AND METHOD TO CONTROL A THREE-DIMENSIONAL (3D) PRINTER," U.S. Provisional Patent Application No. 62/340,453, filed May 23, 2016 and entitled "SYSTEM AND METHOD TO CONTROL A THREE-DIMENSIONAL (3D) PRINTING DEVICE," U.S. Provisional Patent Application No. 62/340,436, filed May 23, 2016 and entitled "SYSTEM AND METHOD TO CONTROL A THREE-DIMENSIONAL (3D) PRINTER," and U.S. Provisional Patent Application No. 62/340,432, filed May 23, 2016 and entitled "3D PRINTER CALIBRATION AND CONTROL," the contents of each of the aforementioned applications are expressly incorporated herein by reference in their entirety.

FIELD OF THE DISCLOSURE

The present disclosure is generally related to calibrating and/or controlling a three-dimensional (3D) printer.

BACKGROUND

Prior to initiation of printing, some 3D printers, e.g., printer hardware and software, may build a computational model of each "slice" or "layer" of the entire 3D printing process. For example, some 3D printers may select printer parameters, e.g., nozzle temperature, layer height, in-fill patterns, maximum speed, maximum acceleration, and so forth, beforehand, taking into account expected properties of the input materials. However, such 3D printers may not account for variances of the material properties, e.g., when a new source material is input into the printer system, and/or the impact of the interaction between the new input materials and the various components of the 3D printer or the environment the 3D printer is in.

For 3D printers that do provide for sensing material and/or tool properties during printing, optical imaging devices, e.g., cameras, may be used. For example, optical imaging devices may be used to identify surface defects, dimensional inaccuracies that fall outside of acceptable tolerances, and similar failure modes. The solution for these failure modes may include interrupting the printing process, shutting down the 3D printer, and removing the defective printed object.

SUMMARY

The present disclosure may enable a reliable 3D printer and printing system adapted to print objects, which satisfy required tolerances, by incorporating sensor-based feedback to update the internal path-plan representation mid-print or on-the-fly, to produce objects in an efficient manner with a high throughput.

Calibration and control systems and methods for 3D printers are also described herein. For example, in some aspects, a sensor (e.g., profilometer) may be used to determine print layer height during a calibration process at a 3D printer, including 3D printers having multiple extruders (and, by extension, multiple available printing materials for deposition). To illustrate, in some aspects, a profilometer may be used to iteratively determine a "zero" height for a first extruder of the 3D printer that is configured to deposit a first material (e.g., a plastic). After determining the "zero" height for the first extruder, a layer of the first material may be deposited. The profilometer may then iteratively be used to determine a "zero" height for a second extruder of the 3D printer that is configured to deposit a second material (e.g., a material that includes a metal, such as silver). Advantageously, the "zero" heights of the two extruders may be aligned during calibration to improve 3D printing performance.

In some aspects, a 3D printer includes an instruction pre-processor (e.g., code monitor) that enables control of certain functions. To illustrate, the 3D printer may support execution of machine instructions represented in a numerical control programming language, such as GCode. The 3D printer may include a monitor, such as a GCode monitor, that is configured to intercept particular data in GCode machine instructions and to cause the 3D printer to perform specific functions in response. To illustrate, when specific keywords or numbers are intercepted, the 3D printer may replace the intercepted instruction(s) with different instructions, may forward the intercepted instruction(s) to a specific component or controller of the 3D printer, etc. The ability to intercept and react to specific keywords or numbers in GCode may provide a layer of software abstraction for the 3D printer. To illustrate, different 3D printers may replace a "wipe tool" GCode instruction with different instructions that are specific to the different 3D printers. As another example, a 3D printer may recognize specific keyword(s) or number(s) as being directed to a component that is not typically controlled using GCode.

In a first aspect, the a computer-implemented method for 3D printing includes receiving, by a processing device, a 3D model of an object to be printed; receiving, by the processing device, sensed information including a material property (ies) of a material to be three-dimensionally printed; and generating, by the processing device, a set of sensor-based printer control parameters, e.g., a head path and at least one printing property, to print the object based, at least in part, on the sensor input. In some implementations, the method may further include initiating 3D printing of the object in the 3D printer according to the head path-plan; receiving, during 3D printing, information from a sensor(s) associated with the 3D printing; and adjusting a printing property(ies) based on the sensor information. In some variations, the printing property(ies) is adjusted without stopping the 3D printing. In some implementations, the printer includes multiple printing heads and each printing head is adapted to output a material with different material properties.

In some implementations, the printing property(ies) to be modified based on sensor feedback may include head speed, extrusion speed, head temperature, dwell time before printing, dwell time after printing, applied extrusion pressure (which may be applied pneumatically or volumetrically), retraction technique, minimum nozzle size, minimum layer thickness, maximum layer thickness. The input and/or sensed material property(ies) may include one or more of viscosity, density, strength, yield stress, melting temperature, melting pressure, glass transition temperature, average particle size, largest particle size, solvent evaporation rate, and solvent permeability, which may be identified experimentally or theoretically.

In some embodiments, generating a set of sensor-based printer control parameters comprises slicing the 3D model into a number of ordered layers and generating a set of sensor-based printer control parameters for each ordered layer; optimizing printer head travel paths; and/or combining printer head movements with extrusion commands. In some implementations, each ordered layer comprises a polygon(s) and/or a polyline(s).

In some implementations, the method may further include exporting a generated sensor-based printer control parameter to the 3D printer, wherein the sensor-based printer control parameter is storable as a variable; and resolving, manually by a printer operator or automatically by the processing device, the variable into a value set.

In some implementations, the received material property and/or other sensor-based information may include information received from an optical camera, an imaging device, and/or an in-line imaging device, and the method further includes comparing an image recorded by the optical camera, the imaging device, and/or the in-line imaging device to an expected image. In some variations, the method includes adjusting a rate of extrusion, based on the comparison of the recorded and expected images.

In a second aspect, a non-transitory computer program product embodied on a computer-readable medium comprises computer code for 3D printing. In some embodiments, the code includes instructions executable by a processing device for receiving a 3D model of an object to be printed; receiving information including a material property(ies) of a material to be three-dimensionally printed; and generating a set of sensor-based printer control parameters to print the object by a 3D printer based at least in part on a sensor input.

In a third aspect, a 3D printing system includes a processing device, a printer head(s), and a sensor(s), e.g., a force probe, a weight sensor, an optical camera, an imaging device, an in-line imaging device, a profilometer, a laser measurement device, a 3D scanner, and an automatic digital multimeter. In some variations, the processing device is adapted to execute instructions for receiving a 3D model of an object to be printed; receiving information including a material property(ies) of a material to be three-dimensionally printed; and generating a set of sensor-based printer control parameters to print the object by a 3D printer based at least in part on sensor input. In some variations, the processing device is further adapted to execute instructions for initiating 3D printing of the object in the 3D printer; receiving, during 3D printing, information from a sensor(s) associated with the 3D printing; and adjusting a printing property(ies) based on the sensor information. In some variations, the sensor(s) is mountable on a dispensing system.

In some implementations, the processing device is configured to compare an image recorded by an optical camera, an imaging device, and/or an in-line imaging device with an expected image. An extrusion multiplier may be adapted to adjust a rate of extrusion, based on the comparison of the recorded and expected images.

In a fourth aspect, a method includes scanning, by a profilometer of a 3D printing device, at least a region of a deposition platform of the 3D printing device to generate first scan data. The method also includes depositing, by a first extruder of the 3D printing device, a first line of a first material on the region of the deposition platform. The method further includes scanning, by the profilometer, the first line to generate second scan data. The method includes determining a height of the first line based on the first scan data and the second scan data and adjusting a line height calibration setting of the 3D printing device based on the height of the first line.

In a fifth aspect, a computer-readable storage device stores instructions that are executable by a processor to cause the processor to perform operations including receiving first scan data from a profilometer, the first scan data associated with at least a region of a deposition platform. The operations also include receiving second scan data from the profilometer, the second scan data associated with a first line of a first material deposited by a first extruder on the region of the deposition platform. The operations further include determining a height of the first line based on the first scan data and the second scan data and initiating an adjustment of a line height calibration setting associated with the first extruder based on the height of the first line.

In a sixth aspect, a 3D printing device includes a profilometer configured to scan at least a region of a deposition platform to generate first scan data and a first extruder configured to deposit a first line of a first material on the region of the deposition platform. The profilometer is further configured to scan the first line to generate second scan data. The 3D printing device further includes a controller coupled to the profilometer, the first extruder, or both. The controller is configured to determine a height of the first line based on the first scan data and the second scan data and to adjust a line height calibration setting associated with the first extruder based on the height of the first line.

In a seventh aspect, a computing device includes a processor and memory accessible to the processor, the memory storing instructions that are executable by the processor to cause the processor to perform operations including receiving first scan data from a profilometer, the first scan data associated with at least a region of a deposition platform. The operations also include receiving second scan data from the profilometer, the second scan data associated with a first line of a first material deposited by a first extruder on the region of the deposition platform. The operations further include determining a height of the first line based on the first scan data and the second scan data and initiating an adjustment of a line height calibration setting associated with the first extruder based on the height of the first line.

In an eighth aspect, a method includes obtaining, at a 3D printing device, machine instructions to generate a physical model of an object. The method also includes analyzing the machine instructions to detect placeholder data, where the placeholder data identifies a function to be performed by the 3D printing device. The method further includes determining one or more instructions that are executable to cause the 3D printing device to perform the function and modifying the machine instructions by replacing the placeholder data with the one or more instructions.

In a ninth aspect, a computer-readable storage device stores instructions that are executable by a processor to cause the processor to perform operations including obtaining machine instructions to generate a physical model of an object. The operations also include analyzing the machine instructions to detect placeholder data, where the placeholder data identifies a function to be performed by a 3D printing device. The operations further include determining one or more instructions that are executable to cause the 3D printing device to perform the function and modifying the machine instructions by replacing the placeholder data with the one or more instructions.

In a tenth aspect, a 3D printing device includes one or more extruders configured to deposit material on a deposition platform and an actuator coupled to the one or more extruders, the deposition platform, or a combination thereof. The 3D printing device also includes a controller configured to control the actuator and an interface configured to receive machine instructions to generate a physical model of an object. The 3D printing device further includes an instruction pre-processor configured to detect placeholder data in the machine instructions, to determine one or more instructions that are executable by the controller to perform a function identified by the placeholder data, to modify the machine instructions by replacing the placeholder data with the one or more instructions, and to send the modified machine instructions to the controller.

In an eleventh aspect, a computing device includes a processor and a memory accessible to the processor, the memory storing instructions that are executable by the processor to cause the processor to perform operations including generating placeholder data that identifies a function to be performed by a 3D printing device. The operations also include processing the model data and the placeholder data to generate machine instructions executable by the 3D printing device to generate a physical model of the object, where the machine instructions include the placeholder data.

In a twelfth aspect, a method includes obtaining model data specifying a 3D model of an object. The method also includes generating placeholder data that identifies a function to be performed by a 3D printing device. The method further includes processing the model data and the placeholder data to generate machine instructions executable by the 3D printing device to generate a physical model of the object, where the machine instructions include the placeholder data.

BRIEF DESCRIPTION OF DRAWINGS

The foregoing features and advantages of embodiments of the disclosure will become more apparent from a reading of the following description in connection with the accompanying drawings, in which.

DETAILED DESCRIPTION

Embodiments of the disclosure include a 3D printer and 3D printing system that include the system, hardware, electronics, input materials, and at least a portion of the software needed to three-dimensionally print an object, and, more specifically, an object comprising at least one material property and, in some implementations, a plurality of input materials having a least one different material property. Advantageously, the 3D electronics printer uses sensor-based data from at least one sensor to update a head path-plan and machine commands to print a 3D object.

Three-Dimensional (3D) Printing System

Figure 1:
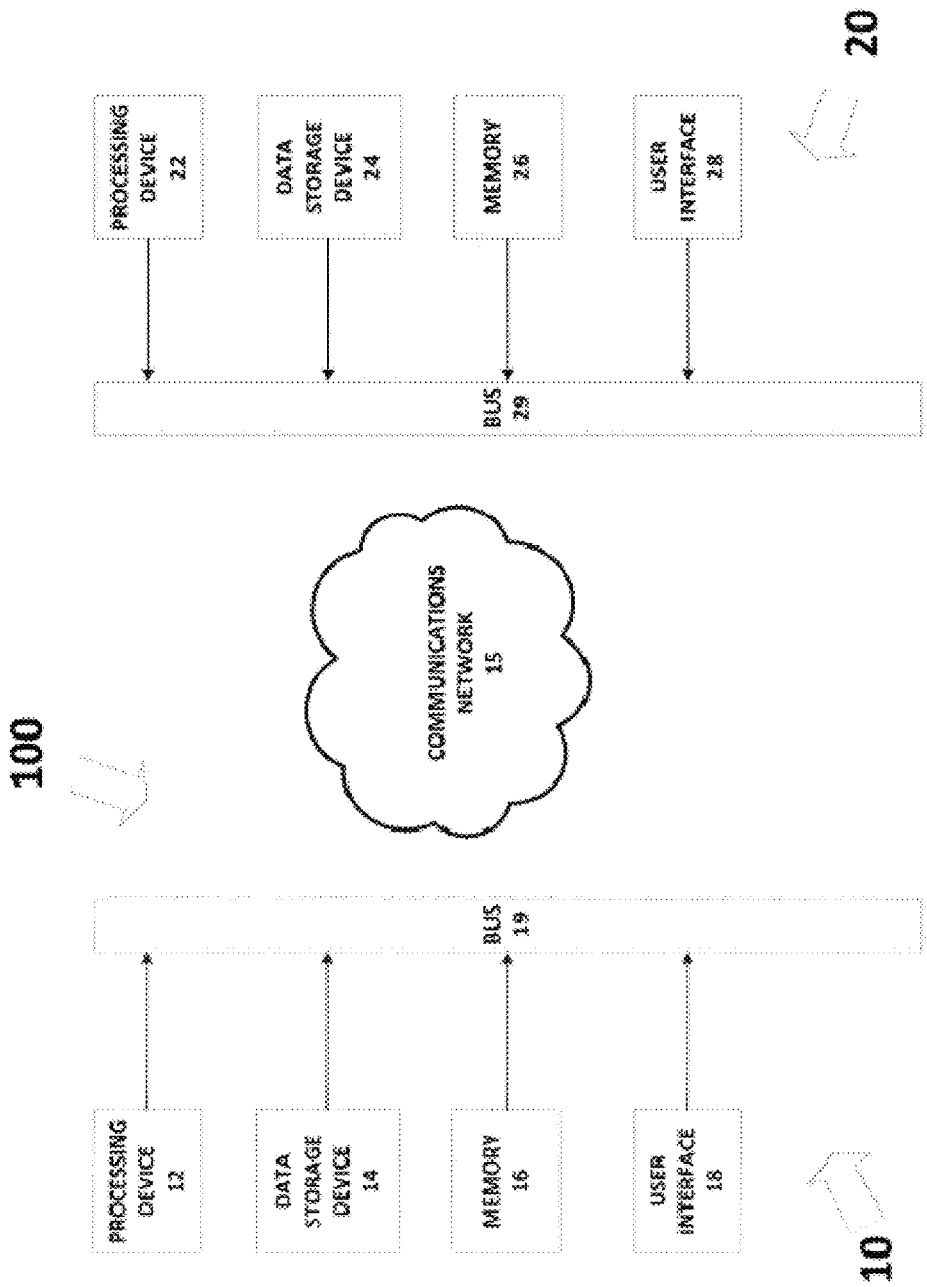
FIG. 1 shows a block diagram of an illustrative embodiment of a 3D printing system in accordance with some aspects of the present disclosure.
Figure 2:
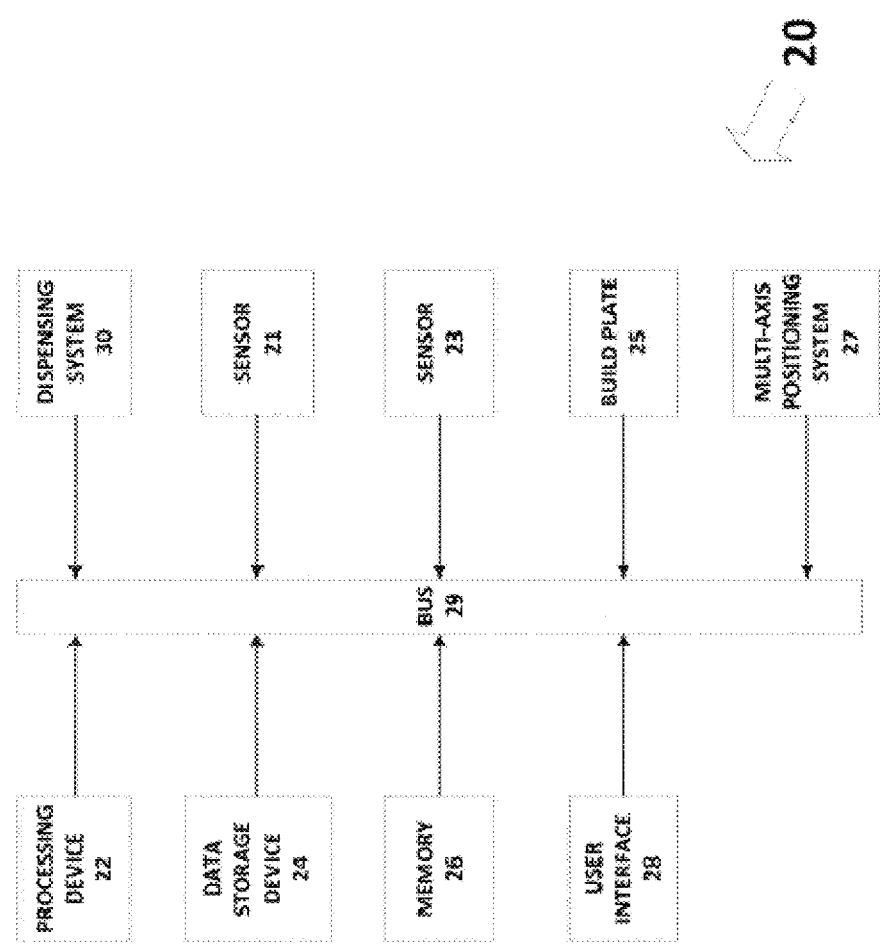
FIG. 2 shows a block diagram of an illustrative embodiment of a 3D printer in the printing system of FIG. 1.

Referring to FIGS. 1 and 2, illustrative embodiments of a 3D printing system 100 and an exemplary 3D printer 20, respectively, are shown. In some embodiments, the system 100 may comprise the 3D printer 20 and a remote server (processing device) 10 that are in communication via a communications network 15. A communications network 15 generally connects a client with a server, and, in the case of peer-to-peer communications, may connect two peers. Communication may take place via any medium such as a public-switched telephone network (PSTN), a wired or wireless local area network (LAN) or a wired or wireless wide area network (WAN) links (e.g., T1, T3, 56 kb, X.25), broadband connections (e.g., ISDN, Frame Relay, ATM), wireless personal area network (PAN), wireless links (e.g., 802.11, Bluetooth, Zigbee, IrDa, or other suitable protocol), and so on. To exchange data via a communications network 15, the processing devices and communications network 15 may use various methods, protocols, and standards, including, inter alia, token ring, Ethernet, TCP/IP, UDP, HTTP, FTP, and SNMP. Thus, the communications network 15 may carry, for example, TCP/IP, UDP, OSI or other protocol communications, and HTTP/HTTPS requests made by a Web browser and the connection may be made between the peers and communicated over such TCP/IP networks. Those of ordinary skill in the art can appreciate that plural communications networks 15 may also be used by the remote server 10 and the 3D printer 20.

The type of communications network 15 is not a limitation, however, and any suitable network may be used. Non-limiting examples of networks that can serve as, or be part of, the communications network 15 include a wireless or wired Ethernet-based intranet, a LAN or WAN, and/or the global communications network known as the World Wide Web and/or the Internet, which may accommodate many different communications media and protocols.

When used in a LAN networking environment, processing devices may be connected to the LAN through a network interface or adapter. When used in a WAN networking environment, processing devices typically include a modem or other communication mechanism. Modems may be internal or external, and may be connected to a system bus, e.g., via a user-input interface, or other appropriate mechanism. Processing devices may also be connected over the Internet, an Intranet, Extranet, Ethernet, or any other system that provides communications. Furthermore, components of the system may communicate through a combination of wired or wireless paths.

Those skilled in the art may appreciate that embodiments of the disclosure may be practiced with various computer system configurations, including multiprocessor systems, microprocessor-based or programmable consumer electronics, minicomputers, mainframe computers, and the like. Embodiments of the disclosure may also be practiced in distributed computing environments where tasks are performed by remote processing devices that are linked through the communications network 15. In a distributed computing environment, program modules may be located in both local and remote computer storage media including memory storage devices.

In some embodiments, each of the 3D printer 20 and the remote server 10 may include a processing device 12, 22; a data storage device 14, 24; memory 16, 26; and a user interface 18, 28. The processing device 12, 22 may comprise an operating system that manages at least a portion of the hardware elements included therein.

The processing device 12, 22 may be structured and arranged to perform or execute a series of instructions, e.g., an application, an algorithm, a driver program, and the like, that result in manipulated data. There are many examples of processing devices 12, 22 including, for the purpose of illustration and not limitation, network appliances, personal computers, workstations, mainframes, networked clients, servers, media servers, application servers, database servers, and web servers. The processing device 12, 22 may be a commercially available processor such as an Intel Core, Motorola PowerPC, MIPS, UltraSPARC, or Hewlett-Packard PA-RISC processor, but also may be any type of available processing device 12, 22 or controller.

Certain aspects and functions of the present disclosure may be located on a single processing device 12, 22 or system 100 or may be distributed among a plurality of processing devices 12, 22 or systems 100 connected to one or more communications networks 15. For example, various aspects and functions may be distributed among one or more processing systems 22 configured to provide a service to one or more client computers, or to perform an overall task as part of a distributed system. Additionally, aspects may be performed on a client-server 12 or multi-tier system that includes components distributed among one or more server systems 22 that perform various functions. Thus, the disclosure is not limited to executing on any particular system or group of systems. Moreover, aspects may be implemented in software, hardware or firmware, or any combination thereof. Thus, aspects in accord with the present disclosure may be implemented within methods, acts, systems, system elements, and components using a variety of hardware and software configurations, and the disclosure is not limited to any particular distributed architecture, network, or communication protocol.

Typically, a processing device 12, 22 executes an operating system that may be, for example, a Windows-based operating system (e.g., Windows 7, Windows 2000 (Windows ME), Windows XP operating systems, and the like) available from the Microsoft Corporation of Seattle, Wash.; a MAC OS System X operating system available from Apple Computer of Cupertino, Calif.; a Linux-based operating system distributions (e.g., the Enterprise Linux operating system) available from Red Hat, Inc. of Raleigh, N.C.; or a UNIX operating system available from various sources. Many other operating systems may be used, and embodiments are not limited to any particular implementation. Operating systems conventionally may be stored in memory 16, 26.

The processing device 12, 22 and the operating system together define a processing platform for which application programs in high-level programming languages may be written. These component applications may be executable, intermediate (for example, C−) or interpreted code which communicate over a communication network (for example, the Internet) using a communication protocol (for example, TCP/IP). Similarly, aspects in accordance with the present disclosure may be implemented using an object-oriented programming language, such as SmallTalk, Java, C++, Ada, or C# (C-Sharp). Other object-oriented programming languages may also be used. Alternatively, functional, scripting, or logical programming languages may be used. For instance, aspects of the system may be implemented using an existing commercial product, such as, for example, Database Management Systems such as SQL Server available from Microsoft of Seattle, Wash., and Oracle Database from Oracle of Redwood Shores, Calif. or integration software such as Web Sphere middleware from IBM of Armonk, N.Y. However, a processing device 12, 22 running, for example, SQL Server may be able to support both aspects in accordance with the present disclosure and databases for sundry applications not within the scope of the disclosure. In one or more of the embodiments of the present disclosure, the processing device 12, 22 may be adapted to execute at least one application, algorithm, driver program, and the like. The applications, algorithms, driver programs, and the like that the processing device 12, 22 may process and may execute can be stored in memory 16, 26.

Memory 16, 26 may be used for storing programs and data during operation of the processing devices 12, 22. Memory 16, 26 can be multiple components or elements of a data storage device(s) 14, 24 or, in the alternate, can be stand-alone devices. More particularly, memory 16, 26 can include volatile storage, e.g., random access memory (RAM), and/or non-volatile storage, e.g., a read-only memory (ROM). The former may be a relatively high performance, volatile, random access memory such as a dynamic random access memory (DRAM) or static memory (SRAM). Various embodiments in accordance with the present disclosure may organize memory 16, 26 into particularized and, in some cases, unique structures to perform the aspects and functions disclosed herein. Advantageously, memory 16, 26 may include software for 3D modeling and head path-planning for 3D printing purposes. The software may be uploaded in the memory 16 of the remote server 10 or, in the alternative, in the memory 26 associated with of the 3D printer 20.

User-input interfaces 18, 28, e.g., graphical user interfaces (GUI) and the like, provide a vehicle for human interaction, with a machine, e.g., the processing device 12, 22, in which the human user provides input to direct the machine's actions while the machine provides output and other feedback to the user for use in future input. User-input interfaces 18, 28 are well known to the art and will not be described in detail.

Components of the processing device 12, 22 may be coupled by an interconnection element such as a bus 19, 29. The bus 19, 29 may include one or more physical busses, e.g., between components that are integrated within a same machine, but may also include any communication coupling between system elements, e.g., specialized or standard computing bus technologies such as IDE, SCSI, PCI, and InfiniBand. Thus, the bus 19, 29 enables communications, e.g., the transfer of data and instructions, to be exchanged internally, between printer 20 and system 100 components.

Three-Dimensional (3D) Printer

In addition to the processing device 22, data storage device 24, memory 26, and user interface 28 described previously, as shown in FIGS. 2 and 3, the 3D printer 20 may also include one or more sensors 21, 23, a build plate 25, a multi-axis positioning system 27, and a dispensing system ("printer head") 30. The build plate 25 may be disposed below the dispensing system 30 and configured to provide a, e.g., planar, surface for 3D printing. In some implementations, the build plate 25 may be supported on a frame, e.g., by a kinematic coupling, to be removable and accurately replaced, even during a build cycle of a single object. In operation, the build plate 25 may translate vertically, e.g., in the z-axis, by a lead screw, ball nut, stepper motor, and the like (e.g., riding along vertically disposed metal rails using spaced brass bushings for low friction and ease of travel). The multi-axis positioning system 27 is structured and arranged to position the dispensing system 30 in multiple axes, e.g., three-axes, relative to the build plate 25 reliably and repeatably.

In some variations, the 3D printer 20 may include one or more sensors 21, 23, e.g., a force probe, a weight sensor, an optical camera, an imaging device, an in-line imaging device, a profilometer, a thermometer, a 3D scanner, a laser measurement device, an automatic digital multimeter, and so forth. A first sensor(s) 21 may be configured for sensing one or more properties of extrudable materials, prior to initiation of a printing operation; while a second sensor(s) 23 may be configured for sensing and collecting data on various components of the 3D printer 20 and/or on the print product while the printing operation is on-going. In some embodiments, material property data, e.g., one or more of viscosity, density, strength, yield stress, melting temperature, melting pressure, glass transition temperature, average particle size, largest particle size, solvent evaporation rate, and solvent permeability, may be combined, by at least one of the processing devices 12, 22, with printing properties, e.g., head speed, extrusion speed, head temperature, dwell time before printing, dwell time after printing, applied extrusion pressure, retraction technique, minimum nozzle size, minimum layer thickness, maximum layer thickness, and so forth, to compose a head path-plan that includes initial selective printer parameters, e.g., nozzle temperature, layer height, in-fill patterns, maximum speed, maximum acceleration, and so forth.

Figure 3:
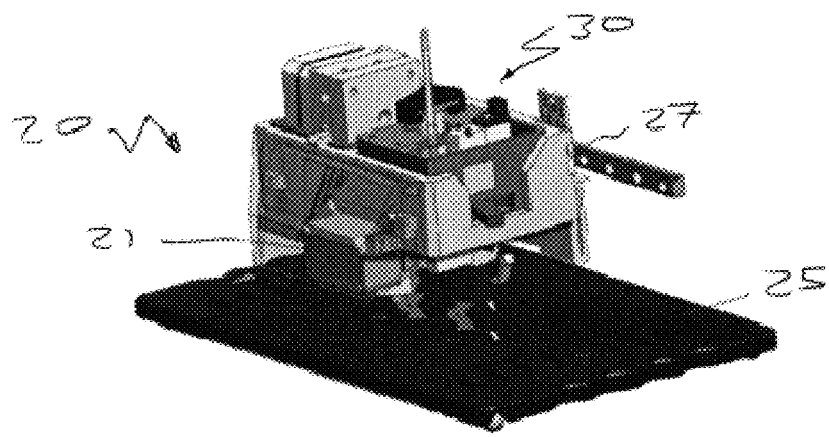
FIG. 3 shows a perspective view of an illustrative embodiment of the 3D printer of FIG. 2.
Figures 4A, 4B:
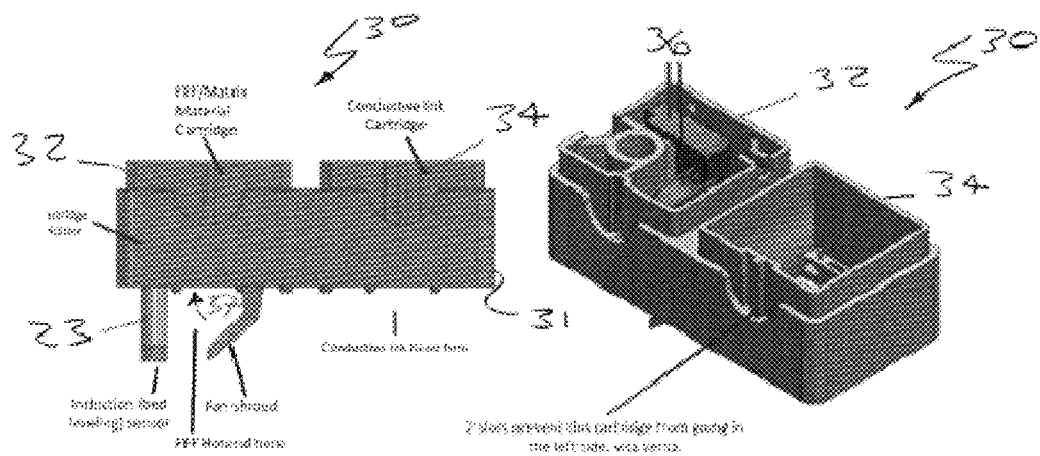
FIG. 4A shows a side view of an illustrative embodiment of a dispensing system in the 3D printer of FIG. 3.
FIG. 4B shows a perspective view of the illustrative embodiment of a dispensing system of FIG. 4A.

Referring to FIGS. 3, 4A, and 4B, the dispensing system 30 may include a cartridge holder 31 that is structured and arranged to hold multiple, e.g., two, removable cartridges 32, 34, each cartridge 32, 34 preferably retaining an extrudable material to form the 3D object and, more preferably, retaining materials having at least one different material property, e.g., viscosity, density, strength, yield stress, melting temperature, melting pressure, glass transition temperature, average particle size, largest particle size, solvent evaporation rate, solvent permeability, and so forth, of the extruded materials. For example, in one implementation, one of the removable cartridges 32 may be structured and arranged to extrude a heated filament, e.g., a polymer, a composite, a ceramic, a fused filament fabrication (FFF)/ matrix material, a thermoplastic (e.g., ABS, PLA, ULTEM thermoplastic-based filament), and the like, and the other cartridge 34 may be structured and arranged to extrude an electrically-conductive material, e.g., room temperature silver.

More particularly, the first cartridge 32 may be structured and arranged to push or pull a first material, e.g., through a heated end 37 ("hotend") of a dispensing tip or nozzle. A heating device heats up the filament sufficiently at the heated end 37 to put it into a liquid or semi-liquid state. While the heating device is heating the extrudable material, heat removal devices, e.g., one or more cooling fans 36, a heat exchange device, and the like, cools the portion of the first cartridge 32 that is not near the heated end 37. The multi-axis positioning system 27 moves the dispensing tip or nozzle relative to the build plate 25 to position the dispensing tip or nozzle and to dispense the heated filament, respectively, in a programmed geometry and according to the head path-plan to create the printed object.

Figure 5:
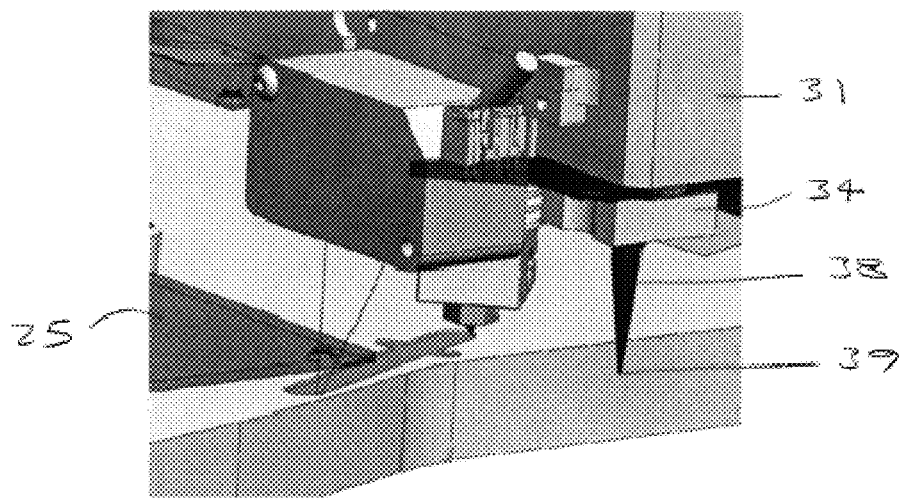
FIG. 5 shows a perspective view of an illustrative embodiment of a dispensing tip or nozzle for the dispensing system of FIG. 3.

The second cartridge 34 may be adapted for dispensing, e.g., pneumatically, a second material, e.g., a mixture of a functional ink, such as conductive, magnetic, dielectric, and/or semiconductor materials (e.g., room temperature silver), and a matrix ink, such as epoxy, silicones, thermoplastic urethane, or combinations thereof, having at least one material property that differs from the first material in the first cartridge 32. Referring to FIG. 5, each cartridge 32, 34 may comprise a hollow dispensing tip or nozzle 38 that is structured and arranged to accurately deliver the extrudable material via an opening 39 at a distal end of the dispensing tip or nozzle 38. The dimensions of the opening 39 and of the hollow dispensing tip or nozzle 38 may vary depending on the material being extruded and the necessary precision of the build.

Method of Three-Dimensional (3D) Printing

A vast majority of contemporary 3D printers executes printing commands and performs head path-planning using a numerical control programming language known as "GCode." Indeed, GCode remains an industry standard for controlling automated machine tools, e.g., a 3D printer, during computer-assisted manufacturing. However, different programming techniques may be required to transform user-input parameters into printing parameters, and, moreover, into head path-planning.

Figure 6:
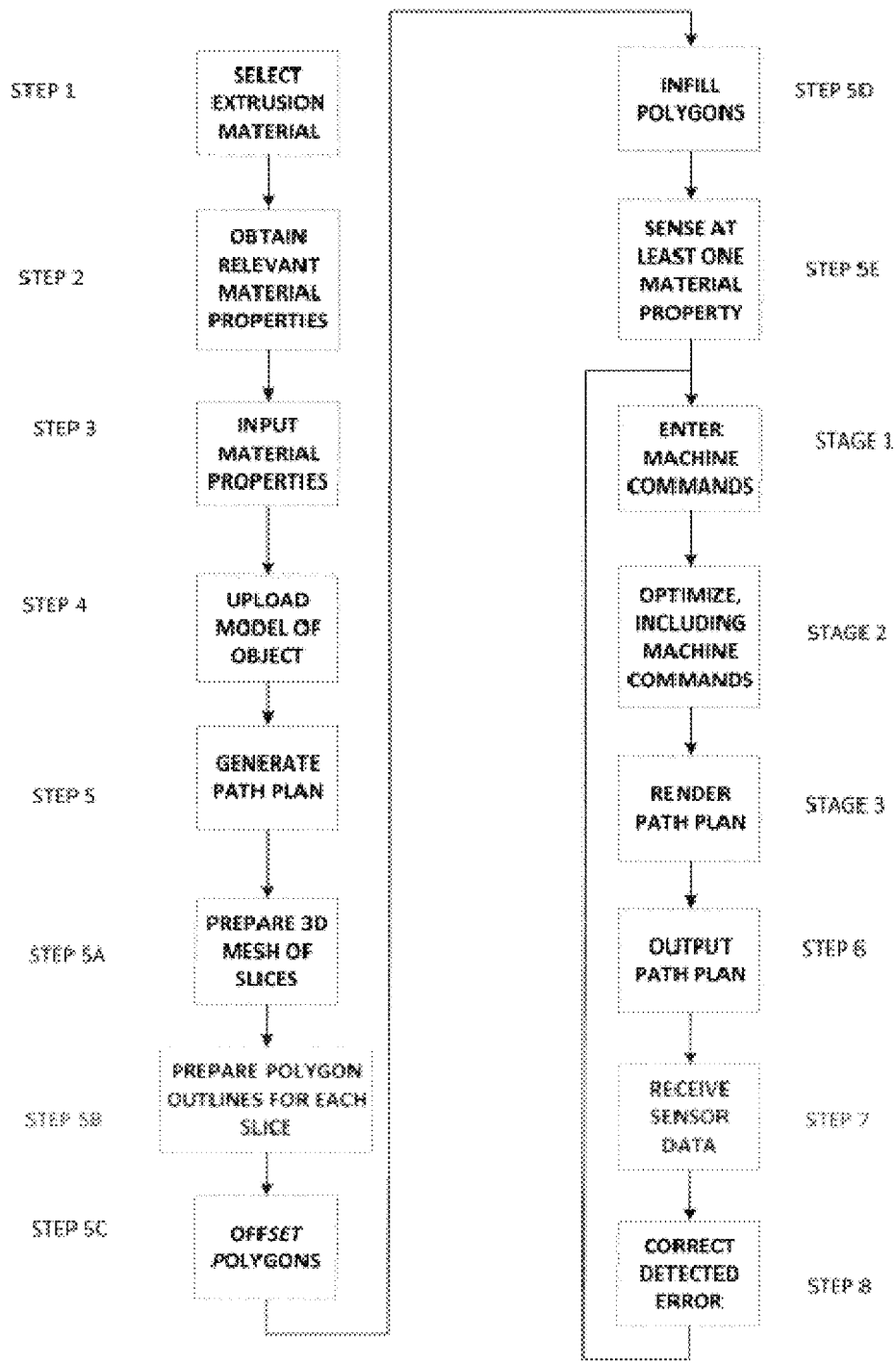
FIG. 6 shows a flow chart of an illustrative embodiment of a 3D printing method in accordance with some aspects of the present disclosure.

Referring to FIG. 6, an illustrative embodiment of a closed-loop method for 3D printing in accordance with the present disclosure is shown. Once a user designates or selects a material(s) to be extruded via a 3D printing operation (STEP 1), the user may obtain, e.g., experimentally, empirically, or theoretically, relevant material properties (STEP 2). Some relevant material characteristics or material properties may include, for the purpose of illustration and not limitation: density, strength, viscosity, yield stress, electrical conductivity, thermal conductivity, melting temperature, average particle size, largest particle size, solvent permeability, solvent evaporation rate, glass transition temperature, and various other rheological properties. The relevant material properties, as well as a description of each property, may be input or entered (STEP 3), e.g., using a graphical user interface (GUI), into the processing device, or read into the processing device from a file stored in memory.

The user may also upload a 3D model of the object to be printed (STEP 4) using the selected extrudable material(s). Advantageously, the 3D model of the object to be printed may be uploaded locally or remotely but processed remotely by the remote server, e.g., using 3D model slicing and head path-planning software. Model slicing processing and path-planning remotely reduce the storage, execution speed, and similar requirements for the local processing device associated with the 3D printer. Notwithstanding, in some variations, processing may be accomplished locally on the 3D printer's processing device. The following description, however, is predicated on remote processing.

The processing device of the remote server may be configured to process the input 3D model and material properties to generate an executable head path-plan (STEP 5) suitable for printing and that includes various (output) printing control parameters. Printing control parameters from such user input properties may include, for the purpose of illustration and not limitation: dispensing tip or nozzle speed, extrusion speed, dispensing tip or nozzle temperature, dwell time before printing, dwell time after printing, pneumatically-applied extrusion pressure, volumetrically-applied extrusion pressure, minimum nozzle size, minimum layer thickness, maximum layer thickness, minimum part density, maximum part height, retraction technique employed, and various other printing parameters.

Generating a computer-executable path-plan (STEP 5) suitable for 3D printing and that takes into account the various printing control parameters may include sub-steps comprising standard data flow for slicing the model associated with additive manufacturing, viz. prepare the 3D mesh for each layer or slice (STEP 5A), prepare polygon outlines for each slice (STEP 5B), offset the polygons on each slice (STEP 5C), and in-fill the polygons on each slice with the material(s) (STEP 5D). These steps are believed to be well known to those skilled in the pertinent art and will not be discussed in detail. Advantageously, each of steps 5A through 5D takes into account one or more of the material properties of each of the materials being extruded.

Conventional systems typically transition from polygon in-fill (STEP 5D) to generating and outputting GCode path-planning instructions (STEP 6); however, advantageously, the embodied method provides additional steps and stages that enable adjusting the path-plan and controlling printer parameters on-the-fly, without having to interrupt the printing operation or shut down the printing process altogether, to compensate for sensed material properties and changes in conditions during manufacture, viz. printing.

More specifically, embodiments of the present disclosure contemplate a processing device adapted to use head path-plan and printer control techniques that differ from those traditionally used with GCode. For example, in some embodiments, prior to generating (STEP 5) and outputting a head path-plan (STEP 6), one or more material properties of at least one of the materials to be extruded is sensed (STEP 5E). The resulting material property data are provided to the remote server for incorporation in the rendered head path-plan (STEP 5). In summary, in some implementations, embodiments of the present disclosure may use actual sensed material property data in formulating the initial path-plan. Moreover, during 3D printing, the processing device may use various information sensed by one or more sensors to make on-the-fly adjustments to the head path-plan, without having to stop the printing process or reject printed products. For example, an input glass transition temperature may be mapped to an extruder temperature via direct linear scaling. Look-up tables (LUTs) containing historical input printing parameters may be re-used when the same or similar materials having the same or similar material properties are used. In some instances, general printing knowledge, prior experimentation, and other heuristics may be used to map input material properties to printing control parameters over a sufficiently useful domain. In other instances, especially with those instances involving novel materials, print test patterns that include variations of estimated printing control parameters may be used to provide empirical "best" working parameters.

In a first stage of the disclosed improvement to 3D printing, higher level 3D printer (hereinafter "machine") commands that have more to do with the printer than with the resulting 3D product, e.g., wipe dispensing tip or nozzle, switch dispensing tip or nozzle, control fan, control temperature, control display LED, and so forth, may be included in one or more appropriate layers in the path-plan (STAGE 1). As a result, during STAGE 1, between printing of a first ordered layer and a second ordered layer, a "wipe dispensing tip or nozzle" command may cause the dispensing system, before moving on to the second ordered layer, to displace to a designated wipe station, where various wipe actions on the dispensing tip or nozzle may be performed, e.g., to remove excess material from the outer surface of the dispensing tip or nozzle and the opening.

In a second stage, the effects of the machine commands vis-à-vis the initial head path-plan may be optimized (STAGE 2) to ensure that a resulting path-plan is optimized for the given constraints. For example, an exemplary constraint may minimize travel moves, by which the head is moved without extruding material, providing the shortest path routes for each ordered layer. Another example of optimization constraints may include changing an order of occurrence of an ordered layer to print an innermost perimeter polygon as the first element of the ordered layer and the outermost perimeter polygon as the last element of the ordered layer, e.g., to leave the dispending tip or nozzle closer to the designated wipe station. Hence, STAGE 2 requires a re-ordering of the input polygons/polylines (STEP 5B), in-fills (STEP 5D), and machine commands (STAGE 1).

In a final stage, the optimized path-plan is reduced to general "move" and "extrude" commands for the dispensing system while higher level machine commands, e.g., "wipe," are reduced to "move" commands for the 3D printer component involved and the path-plan is rendered (STAGE 3) and the initial path-plan is initiated (STEP 6).

Advantageously, embodiments of the present disclosure are closed-loop to incorporate feedback, e.g., sensor data, gathered during printing, for the purpose of updating or modifying the on-going head path-plan on-the-fly, without having to interrupt or stop altogether the on-going printing operation. As a result, the closed-loop with sensor-based feedback enables and facilitates adaptation of the 3D printer to differing environments that might otherwise, on other printers, cause a catastrophic failure in the printing. Representative adjustments to the head path-plan may include, for the purpose of illustration and not limitation, changing one or more of: dispensing tip or nozzle speed, extrusion speed, dispensing tip or nozzle temperature, dwell time before printing, dwell time after printing, pneumatically-applied extrusion pressure, volumetrically-applied extrusion pressure, minimum nozzle size, minimum layer thickness, maximum layer thickness, minimum part density, maximum part height, retraction technique employed, and various other printing parameters.

For example, one or more sensors, e.g., a force probe, a weight sensor, an optical camera, an imaging device, an in-line imaging device, a profilometer, a 3D scanner, a laser measurement device, an automatic digital multimeter, and the like, may sense and transmit sensor data and/or material property data to the processing device (STEP 7) where these data may be analyzed to detect faults or irregularities and introduced back into the path-plan to correct the fault or irregularity (STEP 8) on-the-fly. For example, a laser profilometer may be structured and arranged to sense the width of the output filament (STEP 7), which sensed data, i.e., undersized filaments, may be analyzed by the processing device and a corrective action, e.g., increase extrusion multiplier, taken to account for and/or compensate for the detected error (STEP 8). In another example, an on-board optical imaging device trained at the opening at the distal end of the dispensing tip or nozzle may sense and provide image data (STEP 7), which, when compared to an expected image, indicates that the dispensing tip or nozzle requires cleaning. Accordingly, using such sensor-based data, the processing device may be configured to modify the path-plan to include an immediate machine command, e.g., a "wipe" action. Table I provides a non-exhaustive summary of possible printer control parameter changes for various sensor-based data.

TABLE 1

| Sensor, Sensed Data | Changed Parameter |
| --- | --- |
| Profilometer, single point | Adjust layer height |
| Profilometer, profile of single trace | Adjust extrusion multiplier |
| Profilometer, detect gap | Adjust extrusion multiplier |
| Profilometer, detect gap | In-fill overlap |
| Profilometer, detect trace break | Add new polyline |
| Profilometer, detect misalignment between materials | Adjust tool offset |
| Profilometer, detect line height during calibration | Determine and align "zero" heights of extruders |
| Force probe, detect weak layer | Strengthen layer |
| Force probe, detect weak layer | Increase in-fill percentage |
| Optical camera, detect dirty nozzle | Wipe command repeated or updated |
| Optical camera, detect dimension mismatch | Adjust scale factor |
| Optical camera, detect excessive "ooze" | Adjust dispensing tip temperature |
| Optical camera, detect trace break | Add new polyline |
| Optical camera, detect model slumping | Adjust fan speed |
| Weight scale, detect too little weight | Adjust extrusion multiplier |
| Weight scale, detect too little weight | Wipe command repeated or updated |
| Automatic digital multimeter, detect trace break | Add new polyline |
| Automatic digital multimeter, detect high resistance | Add new polyline |
| Automatic digital multimeter, detect high resistance | Adjust print speed |

Those skilled in the art will readily appreciate that all parameters listed herein are meant to be exemplary and actual parameters depend upon the specific application for which the methods, materials, and apparatus of the present disclosure are used. It is, therefore, to be understood that the foregoing embodiments are presented by way of example only and that, within the scope of the appended claims and equivalents thereto, the disclosure may be practiced otherwise than as specifically described. Various materials, geometries, sizes, and interrelationships of elements may be practiced in various combinations and permutations, and all such variants and equivalents are to be considered part of the disclosure.

Sensor-Based Line Height Calibration of 3D Printing Device

Figure 7:
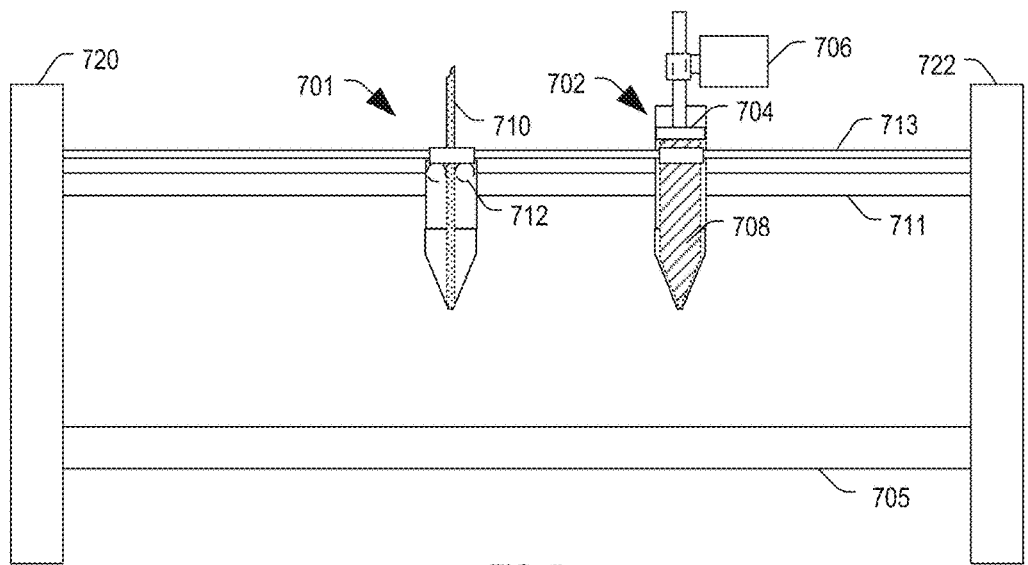
FIG. 7 shows a diagram of another illustrative embodiment of a 3D printer, such as a 3D printer that may be included in the 3D printing system of FIG. 1.

FIGS. 7-11 illustrate a particular aspect of calibrating a 3D printing device based on input received from a sensor, such as a profilometer. As shown in FIG. 7, a 3D printing device may include members 720 and 722 coupled to a deposition platform 705, a support member 711, and a drive belt 713 (which may be coupled to an actuator controlled by a controller). Extruders 701 and 702 are also illustrated. In the example of FIG. 7, the extruder 701 is a filament extruder configured to extrude a filament 710 that is fed to the extruder 701 by drive members 712. A tip of the extruder 701 may be heated to melt the filament 710 for deposition. Further, in the example illustrated in FIG. 7, the extruder 702 is a syringe extruder that includes a plunger 704 coupled to a drive 706. The drive 706 may include a pneumatic drive (e.g., a pressure regulator and/or valve) or a mechanical drive. The drive 706 applies pressure to the plunger 704 to cause a second material 708, to be extruded. The second material 708 may include a paste or a viscous liquid. Although not shown in FIG. 7, the 3D printing device may also include additional components, such as a profilometer, a controller, a processor, a memory, and/or one or more components described with reference to the 3D printer 20 of FIGS. 1-5.

Figure 8:
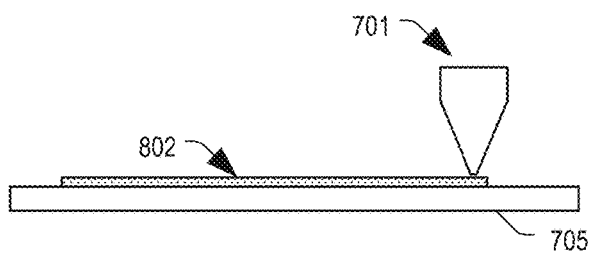
FIGS. 8, 9, 10, and 11 show illustrative embodiments of operation at a 3D printer.

Referring to FIG. 8, a profilometer may scan at least a region of the deposition platform 705 to generate first scan data. The first extruder 701 may then deposit a first line 802 of a first material (e.g., the filament 710), as shown. The profilometer may scan the first line 802 to generate second scan data. A height of the first line 802 may be determined based on (e.g., a difference of) the first scan data and the second scan data. In some examples, the first scan data and the second scan data may be filtered using a median filtering process before determining the height of the first line 802.

In some examples, before the first line 802 is deposited, a surface profile of the deposition platform 705 may be determined, and the surface profile may be accounted for when determining the height of the first line 802. A line height calibration setting may be adjusted based on the height of the first line 802.

Figure 9:
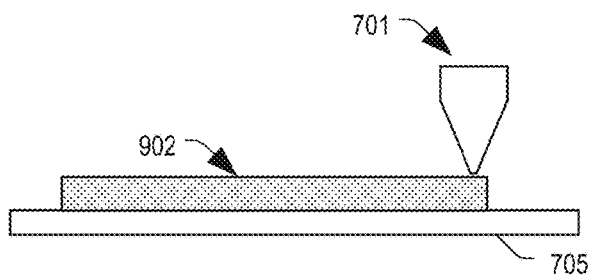
Figure 10:
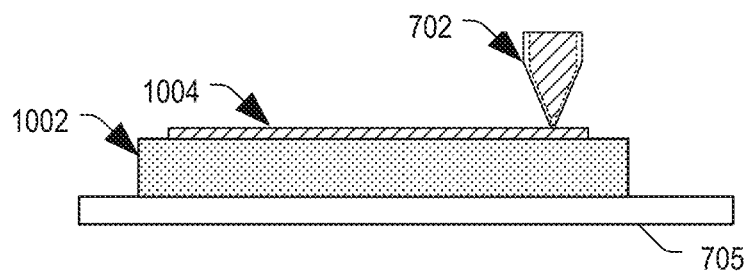

Referring to FIG. 9, the process of depositing a line and determining the height of the line may be iteratively repeated until a criterion is satisfied. For example, the deposition platform 705 may be cleared and an additional line 902 of the first material (e.g., the filament 710) may be deposited on the deposition platform 705. A height of the additional line 902 may be determined and the line height calibration setting may be adjusted. Additional iterations may be performed until the criterion is satisfied. For example, the criterion may correspond to the line height calibration setting differing from the height of a particular line by an amount that satisfies (e.g., is less than) a threshold.

After the line height calibration setting is adjusted, the first extruder 701 may deposit the first material (e.g., the filament 710) to form at least one layer 1002 on the deposition platform 705. The above-described iterative process to determine the line height calibration setting (e.g., a zero height) for the first extruder 701 may then be repeated for the second extruder 702. To illustrate, the second extruder 702 may deposit a line 1004 of the second material 708 on the at least one layer 1002. The profilometer may scan the line 1004 to generate scan data. A height of the line 1004 may be determined based on the scan data, and a second line height calibration setting of the 3D printing device may be adjusted based on the height of the second 1004. In some examples, prior to deposition of the second line 1004, the at least one layer 1002 may be scanned by the profilometer and the resulting scan data may be used in determining the height of the line 1004.

Figure 11:
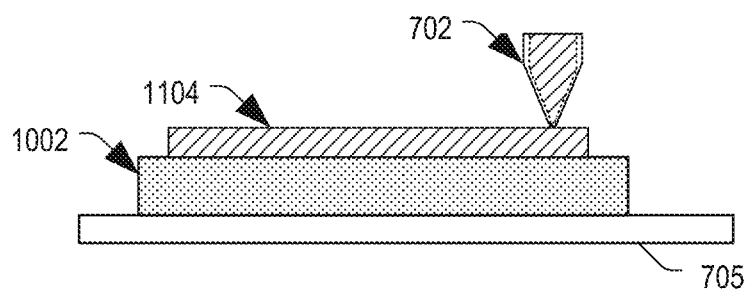

The iterative process of depositing a line of the second material 708, determining the height of the deposited line, and adjusting the second line height calibration setting may be repeated until a criterion is satisfied. To illustrate, as shown in FIG. 11, a second line 1104 of the second material 708 may be deposited on the at least one layer 1002 and the profilometer may scan the second line 1104 to determine a height of the second line 1104. In an illustrative example, the criterion may be satisfied when the second line height calibration setting is determined to differ from a height of a particular line of the second material by an amount that is less than a threshold. The second line height calibration setting may correspond to a "zero" height for the second extruder 702. The calibration process described with reference to FIGS. 7-11 may thus enable determining aligned "zero" heights for multiple extruders of a 3D printing device based on sensor input received from a sensor, such as a laser profilometer.

Code Monitoring at a 3D Printing Device

In particular aspects, a 3D printing device may include an interface (e.g., a wired or wireless interface) to receive machine instructions. To illustrate, the 3D printing device may receive, from a host device, machine instructions (e.g., GCode instructions) to generate a physical model of an object. The 3D printing device may also include an instruction pre-processor configured to detect placeholder data in the machine instructions. The instruction pre-processor may determine one or more instructions that are executable by a controller, such as a controller configured to control an actuator coupled to extruder(s) of the 3D printing device, to perform a function identified by the placeholder data. The instruction pre-processor and may modify the machine instructions by replacing the placeholder data with the one or more instructions. In illustrative examples, the controller, actuator, and extruder(s) correspond to the multi-axis positioning system 27 of FIG. 2 and the instruction pre-processor corresponds to the processing device 22 of FIG. 2.

By detecting and replacing placeholder data in received machine instructions, a 3D printing device may support abstraction of various functions. A host computing device (e.g., the remote server 10 of FIG. 1) may obtain model data specifying a 3D model of an object. The host computing device may generate the placeholder data identifying a function to be performed by the 3D printing device, and may process the model data and the placeholder data to generate machine instructions (e.g., GCode) executable by the 3D printing device to generate a physical model of the object, where the machine instructions include the placeholder data.

In some examples, the 3D printing device may include a controller, such as a GCode controller, configured to execute machine instructions, but the placeholder data may not be executable by the GCode controller. In such examples, the placeholder data, which may not include a GCode command, can be removed from the machine instructions before the machine instructions are provided to the GCode controller. Multiple placeholder data elements may be present in GCode instructions and, in some aspects, certain functions identified by placeholder data may be performed without sending an explicit instructions corresponding to the functions to the GCode controller. As an illustrative non-limiting example, the placeholder data may correspond to a function that enables feedback control of a 3D printing operation based on a sensor of the 3D printing device. In such an example, the placeholder data may be included in a GCode instruction stream to toggle sensor-based feedback control at the 3D printer.

In some aspects, placeholder data in a GCode instruction stream can identify a function using a machine-independent identifier. Different 3D printing devices may respond to intercepting such placeholder data by replacing the placeholder data with different machine-specific instructions that specify operations relating to characteristic(s) of the 3D printing devices. In a particular example, the instructions that replace placeholder data may be determined based on a material available for deposition by the 3D printing device.

Placeholder data corresponding to a machine-independent operation may be replaced by instructions executable by the 3D printing device to perform the machine-independent operation based on a characteristic of the 3D printing device. Illustrative, non-limiting examples of the characteristic of the 3D printing device including, but are not limited to relative positions of two or more components of the 3D printing device, an output of a sensor of the 3D printing device, calibration data associated with the 3D printing device, or a combination thereof. In some aspects, the calibration process described with reference to FIGS. 7-11 may be initiated by including particular placeholder data in a GCode instruction stream sent to the 3D printing device.

The use of placeholder data may also enable other operations. For example, the placeholder data may indicate a target line characteristic of a material to be deposited and the one or more instructions replacing the placeholder data may indicate control parameters to deposit a line of the material based on the target line characteristics. As another example, the placeholder data may indicate that the 3D printing device is to perform a cleaning operation, and the one or more instructions may be executable by the 3D printing device to move an extruder to a location corresponding to a cleaning station, based on one or more characteristics of the 3D printing device, to perform the cleaning operation.

In some aspects, a memory of the 3D printing device stores a lookup table that maps keywords that can be included in the placeholder data to executable instructions. In such examples, upon intercepting placeholder data that includes a keyword, the instruction pre-processor (e.g., GCode monitor) may access the lookup table to determine the executable instructions for the keyword.

It will be appreciated that various operations may be triggered at a 3D printing device may providing the 3D printing device with corresponding placeholder data. For example, a pressure-flowrate relationship may be changed to configure a different extrusion pressure (e.g., at the second extruder 702) based on a temperature reading determined by a sensor of the 3D printing device. As another example, if different 3D printers have different wiping stations or different wiping station locations, generic "wipe" placeholder data may be replaced with executable instructions that are specific to the wiping stations or wiping station locations. Use of placeholder data may enable the 3D printing device to support a more generic external-facing application programming interface (API). To illustrate a slicer may issue placeholder data "wipe tool zero," and upon detecting the placeholder data, the GCode monitor of the 3D printing device may replace the placeholder data with executable GCode instructions to wipe tool zero. In the case of an extrusion pressure command, the GCode monitor may intercept the placeholder data, request a temperature reading, calculate a pressure, and then initiate one or more operations at the 3D printing device based on the temperature and pressure. In another example, the placeholder data may be code to activate another piece of equipment in the 3D printer that is not controlled by the GCode controller. In that case, the GCode monitor may intercept the code, and instead of sending the code to the to the motion controller coupled to the actuator for the extruders, the GCode controller may send the code (e.g., serially) to the other piece of equipment for processing.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive. In some examples, operations described herein may be performed using hardware, software, or a combination thereof. To illustrate, a computer-readable storage device (e.g., a memory, such as a random access memory (RAM) device, a read-only memory (ROM) device, a disk-based memory device, an optical storage device, a solid-state storage device, etc.) may store instructions executable by a process to perform one or more of the operations described herein.

Although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
   scanning, by a profilometer of a three-dimensional (3D) printing device, at least a region of a deposition platform of the 3D printing device to generate first scan data;
   depositing, by a first extruder of the 3D printing device, a first line of a first material on the region of the deposition platform;
   scanning, by the profilometer, the first line to generate second scan data;
   determining a height of the first line based on the first scan data and the second scan data;
   adjusting a line height calibration setting of the 3D printing device based on the height of the first line;
   after adjusting the line height calibration setting of the 3D printing device, depositing, by the first extruder, a portion of the first material on the region of the deposition platform to form at least one layer of the first material;
   depositing, by a second extruder of the 3D printing device, a second line of a second material on the at least one layer of the first material;
   scanning, by the profilometer, the second line to generate third scan data;
   determining a height of the second line based on the third scan data; and
   adjusting a second line height calibration setting of the 3D printing device based on the height of the second line; and
   after forming the at least one layer of the first material, scanning, by the profilometer, the at least one layer of the first material to generate fourth scan data, wherein the height of the second line is determined further based on the fourth scan data.

2. The method of claim 1, further comprising, after adjusting the line height calibration setting of the 3D printing device, iteratively, until a criterion is satisfied:
   depositing an additional line of the first material on the region of the deposition platform; determining a height of the additional line based on scan data; and
   adjusting the line height calibration setting,
   wherein the criterion is satisfied when the line height calibration setting is determined to differ from a height of a particular line by an amount that is less than a threshold.

3. The method of claim 1, further comprising, before depositing the first line, determining a surface profile of the deposition platform, wherein determining the height of the first line based on the first scan data and the second scan data includes accounting for the surface profile of the deposition platform.

4. The method of claim 1, further comprising filtering the first scan data and the second scan data using a median filtering process before determining the height of the first line.

5. The method of claim 1, wherein the first material is different from the second material.

6. The method of claim 1, wherein the height of the second line is determined further based on the line height calibration setting.

7. The method of claim 1, further comprising, after adjusting the second line height calibration setting of the 3D printing device, iteratively, until a criterion is satisfied:
   depositing an additional line of the second material on the at least one layer of the first material;
   determining a height of the additional line based on scan data; and
   adjusting the second line height calibration setting,
   wherein the criterion is satisfied when the second line height calibration setting is determined to differ from a height of a particular line of the second material by an amount that is less than a threshold.

* * * * *